US012692355B2

(12) United States Patent (10) Patent No.: US 12,692,355 B2

Fedurco et al. (45) Date of Patent: Jul. 28, 2026

(54) METHOD FOR MODIFYING EXPANDABLE CURING MEMBRANES FOR MANUFACTURING TYRES

(71) Applicant: COMPAGNIE GENERALE DES ETABLISSEMENTS MICHELIN, Clermont-Ferrand (FR)

(72) Inventors: Milan Fedurco, Clermont-Ferrand (FR); Marco Ribezzo, Clermont-Ferrand (FR); Antonio Delfino, Clermont-Ferrand (FR); Alain Faugeras, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1011 days.

(21) Appl. No.: 17/798,946

(22) PCT Filed: Feb. 18, 2021

(86) PCT No.: PCT/FR2021/050289
§ 371 (c)(1),
(2) Date: Aug. 11, 2022

(87) PCT Pub. No.: WO2021/165622
PCT Pub. Date: Aug. 26, 2021

(65) Prior Publication Data
US 2023/0061734 A1 Mar. 2, 2023

(30) Foreign Application Priority Data
Feb. 20, 2020 (FR) ........................................ 2001697

(51) Int. Cl.
C08J 7/04 (2020.01)
C08J 7/043 (2020.01)

(52) U.S. Cl.
CPC ............. C08J 7/0427 (2020.01); C08J 7/043 (2020.01); *C08J 2383/04* (2013.01); *C08J*

*2483/02* (2013.01); *C08J 2483/05* (2013.01); *C08J 2483/06* (2013.01)

(58) Field of Classification Search
CPC ...... C08J 7/0427; C08J 7/043; C08J 2383/04; C08J 2483/02; C08J 2483/05; C08J 2483/06; C08J 2321/00; C08J 2323/22; C08J 2483/04; B29C 33/58; B29D 2030/0655; B29D 30/0654
See application file for complete search history.

(56) References Cited

U.S. PATENT DOCUMENTS

| | | | |
|---|---|---|---|
| 4,889,677 A | 12/1989 | Hashimoto et al. | |
| 6,464,923 B2 * | 10/2002 | Tsuji ....................... | C08L 83/04 524/588 |
| 2005/0112223 A1 * | 5/2005 | Beers ................. | B29D 30/0662 264/315 |
| 2008/0093771 A1 | 4/2008 | Agostini et al. | |
| 2009/0081323 A1 | 3/2009 | Yano et al. | |
| 2010/0292361 A1 * | 11/2010 | Koellnberger .......... | C07F 17/02 556/11 |
| 2013/0323428 A1 * | 12/2013 | Ochs ..................... | C09J 183/04 524/506 |

OTHER PUBLICATIONS

International Search Report and Written Opinion with English translation mailed Jun. 9, 2021 for International Application No. PCT/FR2021/050289, 11 pages.

* cited by examiner

*Primary Examiner* — Jessica M Roswell

(74) *Attorney, Agent, or Firm* — Dickinson Wright PLLC

(57) ABSTRACT

A process for modifying an expandable curing bladder for a tire, which bladder has a surface intended to come into contact with a tire casing is provided. The process comprises a step of applying to the surface a layer of a silicone rubber composition comprising a first liquid organopolysiloxane bearing chain-end alkenyl groups, a second liquid organohydropolysiloxane and a photoactivatable hydrosilylation catalyst, and a step of exposing the silicone rubber composition covering the surface to irradiation with ultraviolet-visible light.

18 Claims, No Drawings

METHOD FOR MODIFYING EXPANDABLE CURING MEMBRANES FOR MANUFACTURING TYRES

CROSS-REFERENCE TO RELATED APPLICATIONS

This U.S. national phase patent application claims priority to and the benefit of International Patent Application No. PCT/FR2021/050289, filed Feb. 18, 2021, which claims priority to and the benefit of French patent application no. FR2001697, filed Feb. 20, 2020, the contents of which are incorporated herein by reference in their entirety.

BACKGROUND

1. Technical Field

The field of the invention is that of processes for modifying expandable curing bladders for the manufacture of tires.

2. Related Art

Tires are generally obtained by molding and vulcanization of a raw casing inside a curing mold. The external walls of the casing are flattened against the internal walls of the curing mold by means of a curing bladder which can expand under the effect of a pressurized fluid. The tread pattern on the mold inserts and that on the shells are imprinted onto the green casing, which is vulcanized using heat. The curing bladder opens out inside the green casing prior to curing and folds up at the end. For this reason, relative movements occur between the bladder and the casing, which is liable to produce deformations of the casing and wear of the bladder. The degradation of the bladder by these deformation and wear phenomena is also accentuated by two factors.

The first factor is the propensity of the surface of the bladder and of the surface of the inner rubber of the tire to stick to each other due to the similarity of their chemical composition. Specifically, expandable curing bladders for the manufacture of tires are conventionally made of a rubbery material which is generally a crosslinked and reinforced composition of butyl rubber, a copolymer of isobutylene and isoprene, this composition being very similar to the rubber compositions which constitute the inner rubber of tires and which come into contact with the outer surface of the bladder of a curing mold at the time of curing of the tire.

The second factor is the severity of the conditions of use of the bladder, since the curing of the tires is performed at temperatures of at least 100° C. and at pressures of greater than 10 bar in the presence of steam.

To prevent degradation of the bladder, notably by preventing the adhesion of the inner rubber of the tire to the curing bladder, the inner rubber of the green casing of the tires is generally coated with a solution with non-stick properties, for example based on silicone polymers, and known under the name of "lining cement". Such a treatment is performed before the curing, by an operator who works on a dedicated station, at the end of the process for assembling the constituent semifinished products of the tire. This operation proves to consume a great deal of time and manpower.

To overcome this problem, it has been proposed to eliminate this step of applying a lining cement to the surface of the inner rubber of the tire. One solution consists in applying a coating to the surface of the bladder that is adhesive to the bladder without having a propensity for adhering to the inner rubber of the tire. The adhesive coatings described, for example, in U.S. Pat. No. 4,889,677, US 2008/0 093 771, WO 2018/115 600 and WO 2015/166 412 consist of silicone rubber compositions crosslinked using mixtures of at least two polysiloxanes, one bearing alkoxysilane or silanol groups, the other bearing epoxy groups or groups containing an Si—H bond. US 2013/0 323 428 and US 2008/0 093 771 also disclose silicone rubber compositions crosslinked using mixtures of polysiloxanes, some bearing vinyl groups, others containing SiH bonds.

To increase the adhesion of a silicone rubber composition to a substrate, one proposed solution consists in modifying the surface of the substrate prior to applying the silicone rubber composition to the surface of the substrate. Modification of the surface of the substrate may be performed, for example, by plasma treatment, corona treatment or treatment with an adhesion primer, the treatment with an adhesion primer possibly being additional to a plasma or corona treatment. Adhesion primers are moisture-sensitive and temperature-sensitive silanes which can strengthen the adhesive forces between the substrate and the silicone rubber composition. However, treatment with an adhesion primer does not, itself either, lead to an adhesion of the known silicone compositions that withstands the severe conditions of use mentioned above.

The process for modifying the curing bladder by coating its surface with a silicone rubber composition must be able to be performed in a simple and rapid manner, and its implementation must be able to lead to the preparation of a bladder that is capable of maintaining its flexibility after several curing cycles so as to be able to swell and to flatten with each curing cycle without the coating peeling off.

SUMMARY

The Applicant has discovered a novel process for modifying bladders which satisfies this compromise.

Thus, the invention relates to a process for modifying an expandable curing bladder for a tire, which bladder has a surface intended to come into contact with a tire casing, which process comprises the following steps:

a) applying to said surface a layer of a silicone rubber composition, the silicone rubber composition comprising a first liquid organopolysiloxane having repeating units $(R_2SiO_{2/2})$ and having two chain ends each bearing an alkenyl group, a second liquid organopolysiloxane having repeating units $(R'HSiO_{2/2})$ and having two chain ends each bearing a group $SiR'_3O_{1/2}$ and a photoactivatable hydrosilylation catalyst, the symbols R, which may be identical or different, representing an alkyl, aryl or aralkyl group, the symbols R', which may be identical or different, representing an alkyl group, the ratio between the number of units $(R'HSiO_{2/2})$ and the number of alkenyl groups being greater than 1, b) exposing the silicone rubber composition covering said surface to irradiation with ultraviolet-visible light.

DETAILED DESCRIPTION OF EXAMPLE EMBODIMENTS

The compounds mentioned in the description may be of fossil origin or may be biobased. In the latter case, they may be partially or totally derived from biomass or may be obtained from renewable starting materials derived from biomass. Polymers, plasticizers, fillers and the like are notably concerned.

In the present application, the term "liquid substance" means a substance having the ability to eventually assume the shape of its container at room temperature (23° C.).

The process according to the invention is a process for modifying an expandable curing bladder for a tire. Thus, the process in accordance with the invention comprises two steps. One of the steps is the application of a specific silicone rubber composition in the form of a layer in a green state to the outer surface of the curing bladder, i.e. the surface of the bladder which is intended to come into contact with a tire casing in a curing press. The other step is the crosslinking of the specific composition applied to said bladder surface. The implementation of the process in accordance with the invention leads to an expandable curing bladder whose outer surface is covered with a layer of a crosslinked silicone rubber composition.

Expandable curing bladders for tires are well known to those skilled in the art. They are conventionally placed in curing presses used in the manufacture of tires. They consist of compositions based on halogenated or non-halogenated butyl rubber. Butyl rubber is a copolymer of isobutylene and isoprene known for its airtightness properties. A rubber composition constituting a curing bladder generally contains a reinforcing filler such as a carbon black. It also contains a crosslinking system composed of a resin. Crosslinking systems composed of a resin and used to crosslink rubber compositions for an expandable curing bladder are also well known to those skilled in the art. The resin is typically a halogenated or non-halogenated phenolic resin. As phenolic resin, mention may be made of phenol-formaldehyde resins. The rubber composition constituting a curing bladder may comprise various ingredients such as antioxidants, antiozonants, pigments, waxes, plasticizers such as processing oils.

The essential feature of the silicone rubber composition that is useful for the purposes of the invention is that it comprises a first organopolysiloxane which contains $(R_2SiO_{2/2})$ units and a second organopolysiloxane which contains $(R'HSiO_{2/2})$ units and $SiR'_3O_{1/2}$ units, the symbols R representing an alkyl, aryl or aralkyl group, the symbols R' representing an alkyl group. The groups represented by the symbols R and R' preferably contain 1 to 8 carbon atoms, more preferentially 1 to 3 carbon atoms.

The first organopolysiloxane has $(R_2SiO_{2/2})$ repeating units in which the symbols R, which may be identical or different, represent an alkyl, aryl or aralkyl group, preferentially an alkyl group. Within the first organopolysiloxane, the units of formula $(R_2SiO_{2/2})$ can be differentiated from each other by the nature of R. Preferably, the groups represented by the symbols R in the $(R_2SiO_{2/2})$ units contain 1 to 8 carbon atoms, more preferentially 1 to 3 carbon atoms. Even more preferentially, the symbols R in the $(R_2SiO_{2/2})$ units represent a methyl. The first organopolysiloxane is preferentially a polydialkylsiloxane, more preferentially a polydimethylsiloxane.

According to the invention, two of the chain ends of the first organopolysiloxane each bear an alkenyl group. The term "alkenyl group" means a hydrocarbon-based group which contains a carbon-carbon double bond. Preferably, the alkenyl groups are vinyl groups, of well-known formula —CH=CH_2. Very advantageously, two of the chain ends of the first organopolysiloxane each bear a vinyl group. When the first organopolysiloxane has a linear chain, the first organopolysiloxane is an α,ω-alkenyl, preferably α,ω-vinyl, organopolysiloxane. Preferably, the first organopolysiloxane has a linear chain.

The first organopolysiloxane is a liquid polyorganosiloxane. Preferably, it has a weight-average molecular mass of greater than 5000 g/mol and less than 200 000 g/mol. More preferentially, it has a weight-average molecular mass of greater than 10 000 g/mol and less than 150 000 g/mol.

The first organopolysiloxane may be a product that is commercially available, for example from Wacker, Gelest, Dow Corning, Bluestar, Shin-Etsu or Cabot. It may also be a mixture of several organopolysiloxanes which differ from each other by their repeating units or their macrostructure.

The second organopolysiloxane is a polyhydroalkylsiloxane. The units of formula $(R'HSiO_{2/2})$ in which the symbol R' represents an alkyl group are the repeating units of the second organopolysiloxane. In other words, all the monomer units of the second organopolysiloxane are of formula $(R'HSiO_{2/2})$. Within the second organopolysiloxane, the units of formula $(R'HSiO_{2/2})$ can be differentiated from each other by the nature of R'. Preferably, the group represented by R' contains 1 to 8 carbon atoms, more preferentially 1 to 3 carbon atoms. Even more preferentially, the symbols R' represent a methyl, in which case the second organopolysiloxane is preferentially a polyhydromethylsiloxane.

According to the invention, two of the chain ends of the second organopolysiloxane each bear a group $SiR'_3O_{1/2}$, the symbols R', which may be identical or different, representing an alkyl group. Preferably, the groups represented by the symbols R' in $SiR'_3O_{1/2}$ contain 1 to 8 carbon atoms, more preferentially 1 to 3 carbon atoms. Even more preferentially, the symbols R' in $SiR'_3O_{1/2}$ represent a methyl. Very advantageously, two of the chain ends of the second organopolysiloxane each bear an $SiMe_3O_{1/2}$ group. When the second organopolysiloxane has a linear chain, the second organopolysiloxane is an α,ω-$SiR'_3O_{1/2}$ polyhydroalkylsiloxane, preferably α,ω-$SiMe_3O_{1/2}$ polyhydroalkylsiloxane. Preferably, the second organopolysiloxane has a linear chain.

Advantageously, the second organopolysiloxane is an α,ω-$SiMe_3O_{1/2}$ polyhydromethylsiloxane.

The second organopolysiloxane is a liquid polyorganosiloxane. Preferably, it has a weight-average molecular mass of greater than 500 g/mol and less than 30 000 g/mol. More preferentially, it has a weight-average molecular mass of greater than 500 g/mol and less than 10 000 g/mol. Even more preferentially, it has a weight-average molecular mass of greater than 1000 g/mol and less than 5000 g/mol.

The second organopolysiloxane may be a product that is commercially available, for example from Wacker, Gelest or Sigma-Aldrich. It may also be a mixture of several organopolysiloxanes which differ from each other by their repeating units or the macrostructure.

Preferably, at least one from among the first organopolysiloxane and second organopolysiloxane bears a linear chain. Advantageously, both, that is to say the first organopolysiloxane and the second organopolysiloxane, bear a linear chain.

The respective amounts of the first organopolysiloxane and of the second organopolysiloxane in the composition according to the invention are governed by the ratio of the number of $(R'HSiO_{2/2})$ units to the number of alkenyl groups and are adjusted accordingly taking into account the relative proportions of the alkenyl units in the first organopolysiloxane and the relative proportions of the $(R'HSiO_{2/2})$ units in the second organopolysiloxane.

An essential feature of the silicone rubber composition is the ratio of the number of $(R'HSiO_{2/2})$ units of the second organopolysiloxane introduced into the rubber composition to the number of alkenyl groups of the first organopolysiloxane introduced into the rubber composition. This ratio is calculated by dividing the number of $(R'HSiO_{2/2})$ units by the number of alkenyl groups. According to the invention, this ratio of the number of $(R'HSiO_{2/2})$ units to the number of alkenyl groups is greater than 1, preferentially greater than 5. The more the ratio is greater than 1, the better the mechanical and adhesive properties of the silicone rubber composition, thus ensuring good resistance to delamination of the modified bladder. Advantageously, this ratio is greater than 15, very advantageously greater than 25. Preferably, this ratio is less than 100, preferentially less than 90. According to a very preferential embodiment, this ratio is greater than 15 and less than 100. Advantageously, this ratio is greater than 25 and less than 90.

The silicone rubber composition also has the feature of containing a hydrosilylation catalyst intended to catalyse the hydrosilylation reaction of the organosiloxanes of the silicone rubber composition by reaction of the $(R'HSiO_{2/2})$ units of the second organopolysiloxane and alkenyl groups of the first organopolysiloxane. The hydrosilylation catalyst is a photoactivatable hydrosilylation catalyst. The catalyst is inactive in the absence of activation by light irradiation and becomes active when exposed to ultraviolet-visible light irradiation.

Such catalysts are known and are described, for example, in WO 2013/173 090. Preferably, the photoactivatable hydrosilylation catalyst is a platinum, Pt, catalyst.

Examples that may be mentioned include platinum complexes bearing sigma-bonded or pi-bonded carbon-based ligands, referred to hereinbelow as sigma ligands or pi ligands. The term "carbon-based ligand" means a ligand which contains one or more carbon atoms. The photoactivatable hydrosilylation catalyst is preferentially an organometallic complex bearing at least one metal-carbon sigma bond, more preferentially a platinum complex with one or more sigma ligands, the ligand being alkyl or aryl, preferentially alkyl. The alkyl ligands are preferentially alkyls containing 1 to 6 carbon atoms, more preferentially methyl groups. Sigma ligands also include sigma aryl groups such as phenyls, and sigma silyl groups such as trialkylsilyls. Platinum complexes bearing sigma ligands, advantageously alkyls, and a substituted or unsubstituted $\eta^5$-cyclopentadienyl ligand, may also be mentioned as very preferential photoactivatable catalysts. Such catalysts are described, for example, in WO 2013/173 090 and are typically Pt $(\eta^5$-Cp$)$ $L_3$ complexes, Cp denoting the substituted or unsubstituted cyclopentadienyl group, and the symbols L, which may be identical or different, denote alkyl, allyl or aryl.

Photoactivatable catalysts also include platinum complexes bearing a diolefin pi ligand and an aryl sigma ligand, referred to as platinum $\eta$-diolefin-$\sigma$-aryl complex, such as those described in U.S. Pat. No. 4,530,879, EP 122 008 and EP 146 307.

Photoactivatable catalysts also include platinum complexes with diketones as ligands, such as benzoylacetones and diacetylenedicarboxylic acid esters.

Mention may also be made of platinum catalysts coated with a photodegradable organic resin.

Photoactivatable catalysts may also be formed in-situ in the silicone rubber composition, using Pt(0) olefin complexes and adding suitable photoactivatable ligands thereto.

Most particularly preferred photoactivatable catalysts are the complexes of formula Pt$(\eta^5$-Cp$^1)L_3$, Cp$^1$ denoting a cyclopentadienyl group, a cyclopentadienyl group substituted with alkyl or trialkylsilyl groups, and the symbols L, which may be identical or different, denote alkyl. Advantageously, the photoactivatable catalyst is the trimethyl(pentamethylcyclopentadienyl)platinum complex.

As in any conventional hydrosilylation reaction, the amount of catalyst in the composition is catalytic. The term "catalytic amount" means less than one molar equivalent of metal in the complex relative to the total mass of the first organopolysiloxane and of the second organopolysiloxane. The amount of photoactivatable catalyst is such that the amount of metal in the photoactivatable catalyst preferentially ranges from 10 to 5000 ppm, more preferentially from 10 to 1000 ppm, even more preferentially from 500 to 1000 ppm of the total mass of the first organopolysiloxane and of the second organopolysiloxane.

It is also known practice to use photosensitization to activate a photochemical reaction. Photosensitization involves the excitation of a sensitizer under the effect of irradiation, followed by electron or energy transfer between the excited state of the sensitizer and the catalyst. Such a sensitizer is called a photosensitizer. The photosensitizer is chosen by a person skilled in the art as a function of its spectroscopic absorption spectrum in the light used for irradiating and as a function of the electron or energy transfer efficiency. Reference may be made, for example, to the publication "Journal of Chemistry and Photobiology A: Chemistry 303-304 (2015) 86-90".

According to a particular embodiment of the invention, the rubber composition also comprises a photosensitizer, in which case the process involves activation of the catalyst via photosensitization. The amount of photosensitizer introduced into the silicone rubber composition generally varies within a range from 100 ppm to 5000 ppm of the total mass of the first organopolysiloxane and of the second organopolysiloxane. As photosensitizers, thioxanthen-9-one, 2-chlorothioxanthen-9-one, 9,10-dimethylanthrancene, 9,10-dichloroanthrancene and camphorquinone may be suitable for use, preferentially thioxanthen-9-one, 9,10-dimethylanthrancene and camphorquinone, more preferentially thioxanthen-9-one.

The intensity of the light to which the rubber composition is exposed for irradiation is adjusted by a person skilled in the art as a function of the characteristics of the silicone rubber composition, as a function of the thickness of the layer of the silicone rubber composition applied to the bladder, as a function of the distance between the light source and the layer of silicone rubber composition and as a function of the exposure time. The exposure time is at least 1 second, preferentially between 1 and 50 seconds. The exposure is preferentially sequential, in which case the rubber composition is intermittently exposed to irradiation, the total exposure time being between 1 and 50 seconds.

The light source for irradiating the rubber composition is chosen by a person skilled in the art according to the spectroscopic absorption spectrum of the photoactivatable catalyst or of the photosensitizer. Examples of irradiation sources that may be suitable for use include lamps or lasers which emit in the ultraviolet (UV) or visible range, such as UV lamps, UV (ultraviolet) lasers, LED ("light-emitting diode") lamps and LED lasers.

The irradiation is preferably performed with light having wavelengths from 200 to 800 nm.

Exposure of the silicone rubber composition to the irradiation triggers the hydrosilylation reaction of the alkenyl groups of the first organopolysiloxane with the $(R'HSiO_{2/2})$ units of the second organopolysiloxane, bringing about crosslinking of the silicone rubber composition.

According to a first embodiment of the invention, the silicone rubber composition contains a hydrophobic silica. The addition of hydrophobic silica to the silicone rubber composition imparts much better mechanical strength to the crosslinked silicone rubber composition covering the surface of the bladder, which contributes toward further increasing the life of the curing bladder.

As is known, a hydrophobic silica is a silica, part of the surface of which is covered with organic groups such as alkyl groups. The silica may be any reinforcing silica known to those skilled in the art, notably any precipitated or fumed silica. Preferably, the hydrophobic silica has a BET specific surface area of less than 450 $m^2/g$, preferentially within a range from 80 to 400 $m^2/g$, notably from 100 to 300 $m^2/g$, advantageously from 150 to 250 $m^2/g$. It is also possible to use a mixture of several hydrophobic silicas.

To make the silica hydrophobic, it is well known to modify the surface of the silica. Modification of the surface of a silica can be obtained in a known manner by reacting the silica with compounds which bear hydrophobic groups such as trialkylsilyl groups, notably trimethylsilyl groups. A silica which has a surface modified with trimethylsilyl groups, more particularly a silica modified with hexamethyldisilazane, is most particularly suitable for use. According to any one of the embodiments of the invention, the hydrophobic silica preferentially contains more than 2% by mass of carbon, more preferentially at least 3% by mass of carbon.

In the present disclosure, the BET specific surface area is determined by gas adsorption using the Brunauer-Emmett-Teller method described in "The Journal of the American Chemical Society", (vol. 60, page 309, February 1938), and more specifically according to a method derived from the standard NF ISO 5794-1, appendix E, of June 2010 [multipoint (5 point) volumetric method—gas: nitrogen—degassing under vacuum: one hour at 160° C. —relative pressure p/po range: 0.05 to 0.17].

The content of hydrophobic silica is adjusted by a person skilled in the art as a function of its specific surface area and of the intended use of the silicone rubber composition. In the first embodiment, the hydrophobic silica is present in the silicone rubber composition in a mass content preferably greater than or equal to 5% of the weight of the silicone rubber composition and preferentially less than or equal to 40% of the weight of the silicone rubber composition, in which case the silicone rubber composition contains a hydrophobic silica, in a mass content preferentially greater than or equal to 5% of the weight of the silicone rubber composition and preferentially less than or equal to 40% of the weight of the silicone rubber composition.

According to a second embodiment of the invention, the silicone rubber composition contains polyamide microparticles with a melting point above 100° C. The incorporation of the polyamide microparticles into the silicone rubber composition improves the friction resistance properties of the surface of the bladder covered with the crosslinked silicone rubber composition. This result is obtained without the coating losing its flexibility to be able to deform according to the curing cycles and can retain its adhesion to the surface of the curing bladder despite the repeated deformations of the bladder which opens and folds on itself in each curing cycle. It should be recalled that friction is caused by relative movements taking place between the bladder and the tire casing as the curing bladder expands inside the green casing prior to curing and collapses at the end.

The polyamide microparticles may be products that are commercially available, for example from the company Arkema, such as those sold under the name "Orgasol". The polyamide microparticles may be of any shape, and are preferentially spherical.

The polyamide microparticles preferably have a melting point above 150° C. The melting point is conventionally measured according to the standard ASTM D3418-03. As polyamides that are suitable for use, mention may be made of nylon 6, nylon 6,6, nylon 6,10, nylon 6,12, nylon 11 and nylon 12. The polyamide microparticles preferably have a particle size of from 5 to 100 μm, advantageously from 10 to 70 μm. The particle size is typically determined according to the standard ISO 13319-2007. In the second embodiment, the mass content of the polyamide microparticles in the silicone rubber composition is preferentially greater than or equal to 5% of the weight of the silicone rubber composition and preferentially less than or equal to 15% of the weight of the silicone rubber composition, in which case the silicone rubber composition contains the polyamide microparticles in a mass content preferentially greater than or equal to 5% of the weight of the silicone rubber composition and preferentially less than or equal to 15% of the weight of the silicone rubber composition.

According to a third embodiment of the invention, the silicone rubber composition contains a micrometre-sized silicone powder. The term "micrometre-sized powder" means a powder consisting of microparticles. The presence of the micrometre-sized silicone powder in the silicone rubber composition promotes the sliding of the surface of the bladder covered with the crosslinked silicone rubber composition on the surface of the inner rubber while facilitating the evacuation of the curing gases. The improved sliding eliminates molding defects, reduces degradation of the surface state of the bladder, thus extending the life of an expandable curing bladder and increasing the number of curing cycles per bladder.

The micrometre-sized silicone powder preferably consists of microparticles with a mean size ranging from 5 to 100 μm, more preferentially ranging from 5 to 50 μm. The analysis of the size of the microparticles may be performed in order to determine in particular the mean size of the microparticles (or median diameter for microparticles assumed to be substantially spherical), notably according to the standard ISO-8130-13.

Micrometre-sized silicone powders are well-known products and are described, for example, in patent application U.S. Pat. No. 5,538,793. They are also products that are commercially available, for example under the trade names KMP-594, KMP-597, KMP-598, KMP-600, KMP-601 and KMP-602 from Shin-Etsu Co. Preferably, the micrometre-sized silicone powder consists of crosslinked silicone rubber microparticles covered with a silicone resin, the silicone resin being a polyorganosilsesquioxane. The microparticles having the trade names KMP-600, KMP-601 and KMP-602 from Shin-Etsu Co., more particularly still the microparticles having the trade name KMP-602, are most particularly suitable for use. The micrometre-sized silicone powder preferentially has a Shore A hardness of less than 60, more preferentially less than 50, even more preferentially between 20 and 40. As is well known, the Shore A hardness is typically determined by means of the standard ASTM D 2240-97.

In the third embodiment, the micrometre-sized silicone powder is present in the silicone rubber composition preferentially in a mass content of from 5% to 35% of the weight of the silicone rubber composition, in which case the silicone rubber composition contains the micrometre-sized silicone powder in a preferential mass content of from 5% to 35% of the weight of the silicone rubber composition.

According to a particular embodiment of the invention, the rubber composition comprises a hydrophobic silica and polyamide microparticles as defined in the first embodiment and the second embodiment respectively, including the preferential variants thereof. According to this embodiment, the total mass content of hydrophobic silica and of polyamide microparticles in the silicone rubber composition preferentially ranges from 10% to 45% of the weight of the silicone rubber composition, the polyamide microparticles being present in a mass content preferentially ranging from 5% to 15% of the weight of the silicone rubber composition, the hydrophobic silica in a mass content preferentially greater than or equal to 5% of the weight of the silicone rubber composition and preferentially less than or equal to 40% of the weight of the silicone rubber composition.

According to another particular embodiment of the invention, the rubber composition comprises a micrometre-sized silicone powder and polyamide microparticles as defined, respectively, in the third embodiment and in the second embodiment, including the preferential variants thereof. According to this embodiment, the micrometre-sized silicone powder is present in a mass content preferentially ranging from 5% to 35% of the weight of the silicone rubber composition, the polyamide microparticles in a mass content preferentially ranging from 5% to 15% of the weight of the silicone rubber composition.

According to yet another particular embodiment of the invention, the rubber composition comprises a hydrophobic silica, a micrometre-sized silicone powder and polyamide microparticles as defined, respectively, in the first embodiment, in the third embodiment and in the second embodiment, including the preferential variants thereof. According to this embodiment, the hydrophobic silica is present in a mass content preferentially greater than or equal to 5% of the total weight of the silicone rubber composition and less than or equal to 40% of the total weight of the silicone rubber composition, the micrometre-sized silicone powder is present in a mass content preferably ranging from 5% to 35% of the weight of the silicone rubber composition, the polyamide microparticles are present in a mass content preferentially greater than or equal to 5% of the weight of the silicone rubber composition and preferentially less than or equal to 15% of the weight of the silicone rubber composition, the total mass content of hydrophobic silica and polyamide microparticles preferentially ranging from 10% to 45% of the weight of the silicone rubber composition.

Preferably, according to any one of the embodiments of the invention, including the preferential variants thereof, the rubber composition also contains a silicone solvent. Siloxanes with a boiling point at atmospheric pressure (1 atm) of less than 250° C. are particularly suitable for use as silicone solvents. Examples that may be mentioned in this respect include linear trisiloxanes, linear tetrasiloxanes, cyclopentasiloxanes and mixtures thereof, for example octamethyltrisiloxane, decamethyltetrasiloxane, decamethylcyclopentasiloxane, products sold as additives in cosmetics, such as the dimethicone BRB DM 55 sold by the company BRB, the propylheptamethyltrisiloxane SIBRID TM-031 sold by the company Gelest, the trisiloxane KF-96A_1cs, and the dimethicones KF-96L-1.5cs and KF-96L-2cs sold by Shin-Etsu. The use of solvent in the rubber composition makes it possible to facilitate the incorporation of the constituents of the silicone rubber composition and the homogenization thereof in the silicone rubber composition, and, where appropriate, to adjust the viscosity of the silicone rubber composition for the purpose of applying it to the outer surface of the bladder. All or part of the solvent is removed during the crosslinking of the silicone rubber composition.

According to any one of the embodiments of the invention, the total mass amount of the first and second organopolysiloxanes preferentially represents more than 50% by mass of the silicone rubber composition.

According to any one of the embodiments of the invention, the silicone rubber composition is typically prepared by mixing its constituent components. Prior to curing, the silicone rubber composition is applied in the form of a layer to the outer surface of an expandable curing bladder to form a coating on the surface of the bladder after photochemical crosslinking of the silicone rubber composition. The application may be performed using a fine brush, a brush or by spraying. The crosslinked silicone rubber composition is preferentially in the form of a layer with a thickness ranging from 10 μm to 500 μm, more preferentially from 10 μm to 200 μm and more preferentially from 10 μm to 100 μm.

In summary, the invention may be performed according to any one of embodiments 1 to 47:

Embodiment 1: Process for modifying an expandable curing bladder for a tire, which bladder has a surface intended to come into contact with a tire casing, which process comprises the following steps:

a) applying to said surface a layer of a silicone rubber composition, the silicone rubber composition comprising a first liquid organopolysiloxane having repeating units $(R_2SiO_{2/2})$ and having two chain ends each bearing an alkenyl group, a second liquid organopolysiloxane having repeating units $(R'HSiO_{2/2})$ and having two chain ends each bearing a group $SiR'_3O_{1/2}$ and a photoactivatable hydrosilylation catalyst, the symbols R, which may be identical or different, representing an alkyl, aryl or aralkyl group, the symbols R', which may be identical or different, representing an alkyl group, the ratio between the number of units $(R'HSiO_{2/2})$ and the number of alkenyl groups being greater than 1, b) exposing the silicone rubber composition covering said surface to irradiation with ultraviolet-visible light.

Embodiment 2: Process according to embodiment 1, in which the photoactivatable hydrosilylation catalyst is a platinum, Pt, catalyst.

Embodiment 3: Process according to either of embodiments 1 and 2, in which the photoactivatable hydrosilylation catalyst is an organometallic complex containing at least one metal-carbon sigma bond.

Embodiment 4: Process according to any one of embodiments 1 to 3, in which the photoactivatable hydrosilylation catalyst is a platinum complex with one or more sigma ligands, the ligand being alkyl.

Embodiment 5: Process according to embodiment 4, in which the alkyl ligand is an alkyl containing 1 to 6 carbon atoms.

Embodiment 6: Process according to either of embodiments 4 and 5, in which the alkyl ligand is methyl.

Embodiment 7: Process according to any one of embodiments 1 to 6, in which the photoactivatable hydrosilylation catalyst is a complex of the formula $Pt(\eta^5\text{-}Cp^1)L_3$, $Cp^1$ denoting a cyclopentadienyl group, a cyclopentadienyl group substituted with alkyl or trialkylsilyl groups, and the symbols L, which may be identical or different, denoting alkyl.

Embodiment 8: Process according to any one of embodiments 1 to 7, in which the photoactivatable hydrosilylation catalyst is the trimethyl(pentamethylcyclopentadienyl)platinum complex.

Embodiment 9: Process according to any one of Claims 1 to 8, in which the rubber composition also comprises a photosensitizer.

Embodiment 10: Process according to embodiment 9, in which the photosensitizer is thioxanthen-9-one, 2-chlorothioxanthen-9-one, 9,10-dimethylanthrancene, 9,10-dichloro-anthrancene or camphorquinone.

Embodiment 11: Process according to any one of embodiments 1 to 10, in which the irradiation is performed with light of wavelengths from 200 to 800 nm.

Embodiment 12: Process according to any one of embodiments 1 to 11, in which the alkenyl groups are vinyl groups.

Embodiment 13: Process according to any one of embodiments 1 to 12, in which the groups represented by the symbols R and R' contain from 1 to 8 carbon atoms, preferentially from 1 to 3 carbon atoms, and are more preferentially methyl.

Embodiment 14: Process according to any one of embodiments 1 to 13, in which at least one from among the first organopolysiloxane and the second organopolysiloxane has a linear chain.

Embodiment 15: Process according to any one of embodiments 1 to 14, in which the first organopolysiloxane and the second organopolysiloxane have a linear chain.

Embodiment 16: Process according to any one of embodiments 1 to 15, in which the first organopolysiloxane is a polydialkylsiloxane.

Embodiment 17: Process according to any one of embodiments 1 to 16, in which the first organopolysiloxane is a polydimethylsiloxane.

Embodiment 18: Process according to any one of embodiments 1 to 17, in which the second organopolysiloxane is a polyhydromethylsiloxane.

Embodiment 19: Process according to any one of embodiments 1 to 18, in which the second organopolysiloxane is an $\alpha,\omega$-SiMe$_3$O$_{1/2}$ polyhydromethylsiloxane.

Embodiment 20: Process according to any one of embodiments 1 to 19, in which the first organopolysiloxane is a polydialkylsiloxane, preferably a polydimethylsiloxane, and the second organopolysiloxane is a polyhydromethylsiloxane.

Embodiment 21: Process according to any one of embodiments 1 to 20, in which the first organopolysiloxane has a weight-average molecular mass of greater than 5000 g/mol and less than 200 000 g/mol, preferably greater than 10 000 g/mol and less than 150 000 g/mol.

Embodiment 22: Process according to any one of embodiments 1 to 21, in which the second organopolysiloxane has a weight-average molecular mass of greater than 500 g/mol and less than 30 000 g/mol, preferably greater than 500 g/mol and less than 10 000 g/mol, more preferentially greater than 1000 g/mol and less than 5000 g/mol.

Embodiment 23: Process according to any one of embodiments 1 to 22, in which the ratio of the number of (R'H-SiO$_{2/2}$) units to the number of alkenyl groups is greater than 5.

Embodiment 24: Process according to any one of embodiments 1 to 23, in which the ratio of the number of (R'H-SiO$_{2/2}$) units to the number of alkenyl groups is greater than 15.

Embodiment 25: Process according to any one of embodiments 1 to 24, in which the ratio of the number of (R'H-SiO$_{2/2}$) units to the number of alkenyl groups is greater than 25.

Embodiment 26: Process according to any one of embodiments 1 to 25, in which the ratio of the number of (R'H-SiO$_{2/2}$) units to the number of alkenyl groups is less than 100.

Embodiment 27: Process according to any one of embodiments 1 to 26, in which the ratio of the number of (R'H-SiO$_{2/2}$) units to the number of alkenyl groups is less than 90.

Embodiment 28: Process according to any one of embodiments 1 to 27, in which the silicone rubber composition contains a hydrophobic silica.

Embodiment 29: Process according to embodiment 28, in which the hydrophobic silica is present in the silicone rubber composition in a mass content of greater than or equal to 5% of the weight of the silicone rubber composition and less than or equal to 40% of the weight of the silicone rubber composition.

Embodiment 30: Process according to either of embodiments 28 and 29, in which the hydrophobic silica has a BET specific surface area of from 100 to 300 m$^2$/g, preferably from 150 to 250 m$^2$/g.

Embodiment 31: Process according to any one of embodiments 28 to 30, in which the hydrophobic silica is a silica having a surface modified with trialkylsilyl groups, advantageously trimethylsilyl groups.

Embodiment 32: Process according to any one of embodiments 28 to 31, in which the hydrophobic silica is a silica having a surface modified with hexamethyldisilazane.

Embodiment 33: Process according to any one of embodiments 28 to 32, in which the hydrophobic silica contains more than 2% by mass of carbon, preferentially at least 3% by mass of carbon.

Embodiment 34: Process according to any one of embodiments 1 to 33, in which the silicone rubber composition contains polyamide microparticles with a melting point above 100° C.

Embodiment 35: Process according to embodiment 34, in which the polyamide microparticles have a melting point above 150° C.

Embodiment 36: Process according to either of embodiments 34 and 35, in which the polyamide microparticles are present in the silicone rubber composition in a mass content of greater than or equal to 5% of the weight of the silicone rubber composition and less than or equal to 15% of the weight of the silicone rubber composition.

Embodiment 37: Process according to any one of embodiments 34 to 36, in which the polyamide microparticles have a particle size of from 5 to 100 μm.

Embodiment 38: Process according to any one of embodiments 34 to 37, in which the polyamide microparticles have a particle size of from 10 to 70 μm.

Embodiment 39: Process according to any one of embodiments 1 to 38, in which the silicone rubber composition contains a micrometre-sized silicone powder.

Embodiment 40: Process according to embodiment 39, in which the micrometre-sized silicone powder consists of crosslinked silicone rubber microparticles that are coated with a silicone resin, the silicone resin being a polyorganosilsesquioxane.

Embodiment 41: Process according to embodiment 39, in which the micrometre-sized silicone powder is present in the rubber composition in a mass content of from 5% to 35% of the weight of the silicone rubber composition.

Embodiment 42: Process according to any one of embodiments 39 to 41, in which the micrometre-sized silicone powder consists of microparticles with a mean size of from 5 to 100 μm.

Embodiment 43: Process according to any one of embodiments 39 to 41, in which the micrometre-sized silicone powder consists of microparticles with a mean size of from 5 to 50 μm.

Embodiment 44: Process according to any one of embodiments 39 to 42, in which the micrometre-sized silicone powder has a Shore A hardness of less than 60, preferentially less than 50, more preferentially between 20 and 40.

Embodiment 45: Process according to any one of embodiments 1 to 44, in which the silicone rubber composition contains a silicone solvent.

Embodiment 46: Process according to embodiment 45, in which the silicone solvent is a siloxane which has a boiling point at atmospheric pressure (1 atm) below 250° C.

Embodiment 47: Process according to any one of embodiments 1 to 46, in which the total mass amount of the first and second organopolysiloxanes preferentially represents more than 50% by mass of the silicone rubber composition.

The abovementioned features of the present invention, and also others, will be understood more clearly on reading the following description of several implementation examples of the invention, which are given as nonlimiting illustrations.

EXAMPLES

II.1 Tests and Measurements:

Elongation Test:

The sample to be tested is obtained using a 10 [mm]×140 [mm] hollow punch. The sample is placed in a vice. Using a gripper and a 300 [mm] ruler, the sample is stretched until 100% deformation is achieved. This deformation is performed ten times at a frequency of 1 Hz.

Friction Test:

It is performed on a steel bar with a roughness of about 1.6. Diameter 12 [mm] and length 70 [mm]. The bar is placed vertically in the vice. The sample already tested in elongation is used. The sample is moved back and forth with a curvature of 180 on the treated side (face of the sample coated with the silicone rubber composition) against the bar while exerting a friction force of 5 kilogram-force. 20 cycles are repeated, one cycle corresponding to one to and fro movement at a frequency of between 1 and 2 Hz.

Analysis:

After the elongation test or the friction test, the sample is observed by scanning microscopy analysis (FEG 250 model from the company FEI/ThermoFischer, ETD detector (Everhart Thornley detector), 1 kV) to check for the presence or absence of cracks or delamination. The microscopy analysis also makes it possible to estimate the thickness of the layer of the silicone rubber composition applied as a coating.

II.2 Preparation of the Rubber Compositions and Results:

Example 1: In Accordance with the Invention

A hydrophobic fumed silica (6.0 g, HDK-2000, Wacker) is incorporated into an α,ω-vinyl polydimethylsiloxane (10.36 g, DMS V35, Gelest, weight-average molecular mass, Mw, 49 500 g/mol, two vinyl units/mol) by mixing for one minute in a mixer (StateMix). Decamethylcyclopentasiloxane (11.5 g, TCI Europe, D1890) is added by mixing for one minute in the mixer (StateMix). The polyamide microparticles (2.0 g, Orgasol ES3 Nat 3, Arkema) are added and the whole is mixed for 1 minute in the mixer (StateMix). A solution of poly(methylhydro)siloxane (PHMS) (0.82 g, Mw 3200 g/mol, 52 (MeHSiO$_{2/2}$) units, reference 17,620-6, Sigma Aldrich) in decamethylcyclopentasiloxane (4.8 g, TCI Europe, D1890) is incorporated into the resulting mixture by mixing in the mixer (StateMix). Finally, a solution of photoactivatable catalyst (UV LSR KAT, 1.0 g, Momentive, USA) in decamethylcyclopentasiloxane (3.4 g, TCI Europe, D1890) is added. The resulting mixture is homogenized in the mixer (StateMix) for 1 minute. In the silicone rubber composition, the ratio of the number of (MeHSiO$_{2/2}$) units to the number of vinyl groups is greater than 1 (equal to 32).

The silicone rubber composition thus obtained is applied using a fine brush in the form of a layer on an expandable curing bladder based on butyl rubber. The silicone mixture is photochemically crosslinked on exposure to irradiation at a wavelength of 200-800 nm (Uvaprint 100-200 HPCV2 UV lamp, Honle/Germany, placed at a distance of 25 cm from the outer surface) twice for 3 minutes with a 3-minute pause between the two irradiations (200 W/cm for an arc length of 100 mm and power: 20 W/cm$^2$).

The 20-50 μm thick crosslinked silicone rubber composition shows good adhesion to the bladder and does not detach from the bladder even after having successively undergone 10 elongations at 100% deformation. It is also observed that the polyamide microparticles are not removed from the coating by friction. The polyamide microparticles are not torn from the coating when it is subjected to the friction test.

Example 2: In Accordance with the Invention

A hydrophobic fumed silica (6.0 g, HDK-2000, Wacker) is incorporated into an α,ω-vinyl polydimethylsiloxane (10.36 g, DMS V35, Gelest) by mixing for one minute in a mixer (StateMix). Decamethylcyclopentasiloxane (11.5 g, TCI Europe, D1890) is added by mixing for one minute in the mixer (StateMix). The polyamide microparticles (2.0 g, Orgasol ES3 Nat 3, Arkema) are added and the whole is mixed for 1 minute in the mixer (StateMix). A solution of poly(methylhydro)siloxane (PHMS) (0.82 g, reference 17,620-6, Sigma-Aldrich) in decamethylcyclopentasiloxane (4.8 g, TCI Europe, D1890) is incorporated into the resulting mixture by mixing in the mixer (StateMix). 0.050 g of a photoactivator, thioxanthen-9-one (Sigma-Aldrich, T34002) dissolved in 10 ml of chloroform is introduced into the resulting mixture by mixing for 30 seconds in the mixer (StateMix). The chloroform is then distilled off and the product is dried in a vacuum oven (70° C./10 mbar) for one hour. Finally, a solution of the photoactivatable catalyst (UV LSR KAT, 1.0 g, Momentive, USA) in decamethylcyclopentasiloxane (3.4 g, TCI Europe, D1890) is added. The resulting mixture is homogenized in the mixer (StateMix) for 1 minute. In the silicone rubber composition, the ratio of the number of (MeHSiO$_{2/2}$) units to the number of vinyl groups is greater than 1 (equal to 32).

The silicone rubber composition thus obtained is applied using a fine brush in the form of a layer on an expandable curing bladder based on butyl rubber. The silicone mixture is photochemically crosslinked by exposure to irradiation at a wavelength of 395 nm (AC9225F-395 UV LED head lamp, OmniCure, Excelitas, Canada, placed at a distance of 10 cm from the outer surface) for 40 seconds (power: 4 W/cm$^2$). The silicone rubber composition was indeed crosslinked (20-50 μm thick).

The 20-50 μm thick crosslinked silicone rubber composition shows good adhesion to the bladder and does not detach from the bladder even after having successively undergone 10 elongations at 100% deformation. It is also observed that the polyamide microparticles are not removed from the coating by friction. The polyamide microparticles are not torn from the coating when subjected to the friction test.

Example 3: Not in Accordance with the Invention 2.5 g of photoactivatable catalyst (UV LSR CAT, Momentive, USA) are introduced into 25 g of α,ω-vinyl polydimethylsiloxane (Silopren UV LSR 2030, Momentive, USA) by mixing for one minute in a mixer (StateMix). 0.100 g of a photoactivator, thioxanthen-9-one (Sigma-Aldrich, T34002) dissolved in 10 ml of chloroform is introduced into the resulting mixture by mixing for 30 seconds in the mixer (StateMix). The chloroform is then distilled off and the product is dried in a vacuum oven (70° C./10 mbar) for one hour.

The silicone rubber composition thus obtained (yellow color) is applied using a fine brush in the form of a layer on an expandable curing bladder based on butyl rubber. The silicone mixture is photochemically crosslinked by exposure to irradiation at a wavelength of 395 nm (AC9225F-395 UV LED head UV lamp, OmniCure, Excelitas, Canada, placed at a distance of 10 cm from the outer surface) for 40 seconds (power: 4 W/cm$^2$). The crosslinked silicone rubber composition (20-50 μm thick) was indeed crosslinked, but did not adhere to the bladder and became detached from the bladder even after having successively undergone 10 elongations at 100% deformation.

Example 4: Not in Accordance with the Invention

A hydrophobic fumed silica (5.846 g, HDK-2000, Wacker) is incorporated into an α,ω-vinyl polydimethylsiloxane (10.815 g, DMS V35, Mw 49 500, Gelest) by mixing for one minute in a mixer (StateMix). A solution of inhibitor (11 mg, 1-ethynyl-1-cyclohexanol, Aldrich E51406) in decamethylcyclopentasiloxane (10.366 g, TCI Europe, D1890) is then added by mixing for one minute in the mixer (StateMix). The polyamide microparticles (1.95 g, Orgasol ES3 Nat 3, diameter 30 μm, Arkema) are added and the whole is mixed in the mixer for 1 minute (StateMix). A solution of PHMS (0.86 g, poly(methylhydro)siloxane, Mw 3200, reference 17.620-6, Sigma-Aldrich) in decamethylcyclopentasiloxane (4.21 g, D, TCI Europe, D1890) is incorporated into the resulting mixture by mixing in the mixer (StateMix, operating at 100% of its power). Finally, a solution of Karstedt's catalyst (36.1 Aldrich 479519) in decamethylcyclopentasiloxane (15.89 g, TCI Europe, D1890) is added. The resulting mixture is homogenized in the mixer (StateMix) for 1 minute. In the silicone rubber composition, the ratio of the number of (MeHSiO$_{2/2}$) units to the number of vinyl groups is greater than 1 (equal to 32).

The silicone rubber composition thus obtained is applied using a fine brush in the form of a layer on a curing bladder based on butyl rubber. The resulting laminate is maintained at 150° C. for 30 minutes in an air-ventilated oven.

The 20-50 μm thick crosslinked silicone rubber composition shows good adhesion to the bladder and does not detach from the bladder even after having successively undergone 10 elongations at 100% deformation. It is also observed that the polyamide microparticles are not removed from the coating by friction. The polyamide microparticles are not torn from the coating when subjected to the friction test.

Examples 1 and 2 are examples in accordance with the invention, since the silicone rubber compositions have all the features useful for the purposes of the invention, notably a ratio of the number of (R'HSiO$_{2/2}$) units to the number of alkenyl groups of greater than 1, a photoactivatable hydrosilylation catalyst and are applied to the outer layer of a curing bladder and then crosslinked by UV-visible irradiation.

Example 3 is a non-compliant example, since the rubber composition applied to the surface of the bladder does not contain a second organopolysiloxane bearing (R'HSiO$_{2/2}$) repeating units.

Example 4 is a non-compliant example, since the hydrosilylation catalyst of the rubber composition applied to the surface of the bladder is not photoactivatable and the rubber composition is crosslinked by thermal activation at 150° C.

The results show that the process in accordance with the invention leads to the preparation of curing bladders with a coating that has good resistance to delamination. These results are also achieved by implementing quick and easy steps. The process indeed makes it possible to dispense with prior chemical treatments of the bladder surface such as adhesion primer, plasma or corona treatments. The silicone rubber composition used in step a) is also prepared via simple mixing operations. Its crosslinking on the surface of the curing bladder in step b) also takes place within a few minutes. The implementation of the process according to the invention ensures good productivity in the preparation of modified curing bladders that are suitable for use in tire curing presses.

The invention claimed is:

1. A process for modifying an expandable curing bladder for a tire, which bladder has a surface intended to come into contact with a tire casing, which process comprises the following steps:

a) applying to said surface a layer of a silicone rubber composition, the silicone rubber composition comprising a first liquid organopolysiloxane having repeating units R$_2$SiO$_{2/2}$ and having two chain ends each bearing an alkenyl group, the first organopolysiloxane being a polydialkylsiloxane, a second liquid organopolysiloxane having repeating units R'HSiO$_{2/2}$ and having two chain ends each bearing a group SiR'$_3$O$_{1/2}$, the second organopolysiloxane being a polyhydromethylsiloxane, a photoactivatable hydrosilylation catalyst, and polyamide microparticles with a melting point of greater than 100° C., the symbols R, which may be identical or different, representing an alkyl, aryl or aralkyl group, the symbols R', which may be identical or different, representing an alkyl group, the ratio between the number of the repeating units R'HSiO$_{2/2}$ and the number of alkenyl groups being greater than 1, and b) exposing the silicone rubber composition covering said surface to irradiation with ultraviolet-visible light.

2. The process as claimed in claim 1, in which the photoactivatable hydrosilylation catalyst is a platinum, Pt, catalyst.

3. The process as claimed in claim 1, in which the photoactivatable hydrosilylation catalyst is an organometallic complex containing at least one metal-carbon sigma bond.

4. The process as claimed in claim 1, in which the photoactivatable hydrosilylation catalyst is a complex of the formula Pt(η$^5$-Cp$^1$)L$_3$, Cp$^1$ denoting a cyclopentadienyl group, a cyclopentadienyl group substituted with alkyl or trialkylsilyl groups, and the symbols L, which may be identical or different, denoting alkyl.

5. The process as claimed in claim 1, in which the rubber composition also comprises a photosensitizer.

6. The process according to claim 1, in which the alkenyl groups are vinyl groups.

7. The process as claimed in claim 1, in which the ratio of the number of (R'HSiO$_{2/2}$) units to the number of alkenyl groups is greater than 5.

8. The process as claimed in claim 1, in which the ratio of the number of (RHSiO$_{2/2}$) units to the number of alkenyl groups is less than 100.

9. The process as claimed in claim 1, in which the groups represented by the symbols R and R' contain from 1 to 8 carbon atoms.

10. The process as claimed in claim 1, in which the silicone rubber composition contains a hydrophobic silica.

11. The process as claimed in claim 1, in which the silicone rubber composition contains a micrometre-sized silicone powder.

12. The process as claimed in claim 1, in which the silicone rubber composition contains a silicone solvent.

13. The process as claimed in claim 1, in which the total mass amount of the first and second organopolysiloxanes represents more than 50% by mass of the silicone rubber composition.

14. The process as claimed in claim 3, in which the photoactivatable hydrosilylation catalyst is a platinum complex with one or more sigma ligands, the ligand being alkyl.

15. The process as claimed in claim 4, in which the complex is a trimethyl(pentamethylcyclopentadienyl) platinum complex.

16. The process as claimed in claim 10, in which the hydrophobic silica is in a mass content greater than or equal to 5% of the weight of the silicone rubber composition and less than or equal to 40% of the weight of the silicone rubber composition.

17. The process as claimed in claim 1, in which the polyamide microparticles are in a mass content greater than or equal to 5% of the weight of the silicone rubber composition and less than or equal to 15% of the weight of the silicone rubber composition.

18. The process as claimed in claim 11, in which the micrometre-sized silicone powder is in a mass content of from 5% to 35% of the weight of the silicone rubber composition, the micrometre-sized silicone powder consists of crosslinked silicone rubber microparticles covered with a silicone resin, and the silicone resin is a polyorganosilsesquioxane.

* * * * *